United States Patent
Park

(10) Patent No.: US 12,321,226 B2
(45) Date of Patent: Jun. 3, 2025

(54) STORAGE DEVICE AND METHOD OF OPERATING THE SAME

(71) Applicant: SK hynix Inc., Gyeonggi-do (KR)

(72) Inventor: Seon Ha Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 60 days.

(21) Appl. No.: 18/344,880

(22) Filed: Jun. 30, 2023

(65) Prior Publication Data

US 2024/0232003 A1    Jul. 11, 2024

(30) Foreign Application Priority Data

Jan. 9, 2023    (KR) .......................... 10-2023-0002864

(51) Int. Cl.
*G06F 11/10*    (2006.01)

(52) U.S. Cl.
CPC .................................. *G06F 11/10* (2013.01)

(58) Field of Classification Search
None
See application file for complete search history.

(56) References Cited

U.S. PATENT DOCUMENTS

| | | | |
|---|---|---|---|
| 9,430,154 B2* | 8/2016 | Cohen | G06F 11/1068 |
| 2013/0297988 A1* | 11/2013 | Wu | G06F 11/1048 |
| | | | 714/773 |
| 2015/0205527 A1* | 7/2015 | Cohen | G11C 29/52 |
| | | | 711/103 |
| 2023/0072467 A1* | 3/2023 | Thiers | G11C 29/028 |

FOREIGN PATENT DOCUMENTS

KR    10-2018-0086687 A    8/2018
KR    10-2021-0104408 A    8/2021

* cited by examiner

*Primary Examiner* — Guerrier Merant
(74) *Attorney, Agent, or Firm* — IP & T GROUP LLP

(57) ABSTRACT

A storage device of the present disclosure includes a memory device including a plurality of pages, and a memory controller configured to determine whether a data shift error occurs in read data read from a selected page among the plurality of pages based on a number of bits having a first bit-value and a number of bits having a second bit-value among a plurality of bits included in the read data, and shift the read data when the data shift error occurs.

13 Claims, 7 Drawing Sheets

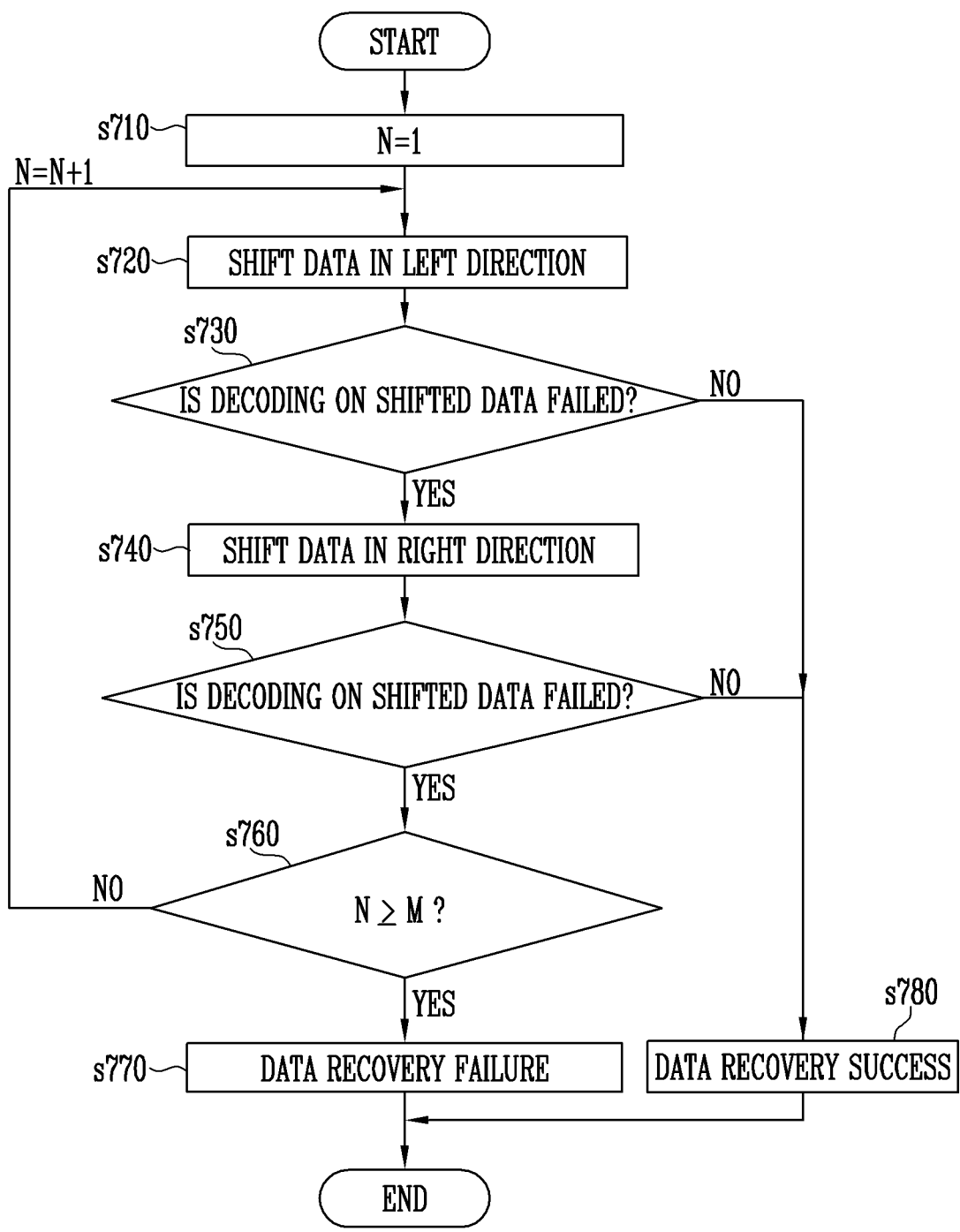

STORAGE DEVICE AND METHOD OF OPERATING THE SAME

CROSS-REFERENCE TO RELATED APPLICATION

The present application claims priority under 35 U.S.C. § 119(a) to Korean patent application number 10-2023-0002864 filed on Jan. 9, 2023, the entire disclosure of which is incorporated by reference herein.

BACKGROUND

1. Field of Invention

Various embodiments of the present disclosure relate to an electronic device, and more particularly, to a storage device and a method of operating the same.

2. Description of Related Art

A storage device may include a memory controller and a memory device. The memory controller may transmit data to the memory device to store the data. A data shift error may occur in a process of transmitting the data or the like. Differently from a distribution error in which a distribution of a threshold voltage is changed due to deterioration or the like, in a case of the data shift error, a concern exists in which a restoration of data by a method of adjusting a level of a read voltage and repeatedly reading the data is difficult. In particular, when the corresponding data is important internally to the storage device, such as a logical-physical address map and booting data, the corresponding data may adversely affect reliability of the data or lead to a fatal error, such as an impossibility of booting. Therefore, a solution for more accurately determining occurrence of a data shift error and solving the data shift error is required.

SUMMARY

Embodiments of the present disclosure are directed to a storage device and a method of operating the same capable of determining occurrence of a data shift error.

According to an embodiment of the present disclosure, a storage device includes a memory device including a plurality of pages, and a memory controller configured to determine whether a data shift error occurs in read data read from a selected page among the plurality of pages based on a number of bits having a first bit-value and a number of bits having a second bit-value among a plurality of bits included in the read data read, and shift the read data when the data shift error occurs.

According to an embodiment of the present disclosure, a method of operating a storage device includes determining, when decoding fails on read data from a memory device, whether a data shift error occurs in the read data based on a number of bits having a first bit-value and a number of bits having a second bit-value among a plurality of bits included in the read data, and performing a data shift operation of shifting the read data when the data shift error occurs.

According to an embodiment of the present disclosure, an operating method of a controller includes controlling a memory device to store therein a data chunk and a corresponding error correction code (ECC), the data chunk in which each of numbers of first and second bit-values is within a reference range, performing a decoding operation on a read data chunk with the ECC, when the read data chunk and the ECC are received from the memory device, shifting, in units of bytes, the read data chunk, when each of the numbers in the read data chunk is within the reference range and each of the numbers in pin bits is within the reference range in response to the decoding operation on the read data chunk being failed, performing the decoding operation on the shifted data chunk with the ECC, and repeating, until the shifted data chunk is error-corrected, the shifting and the decoding operation on the shifted data chunk within a predetermined number of times. The pin bits may be included in the read data chunk and transferred through each of physical pins between the controller and the memory device.

According to the present disclosure, the storage device and the method of operating the same for determining occurrence of the data shift error may be provided. According to the present disclosure, at least a portion of data in which the data shift error occurs may be restored.

BRIEF DESCRIPTION OF THE DRAWINGS

FIG. 7 is a diagram for describing an operating method related to a data shift operation according to an embodiment of the present disclosure.

DETAILED DESCRIPTION

Specific structural or functional descriptions of embodiments according to the concept which are disclosed in the present specification are illustrated only to describe the embodiments according to the concept of the present disclosure. The embodiments according to the concept of the present disclosure may be carried out in various forms and should not be construed as being limited to the embodiments described in the present specification.

Figure 1:
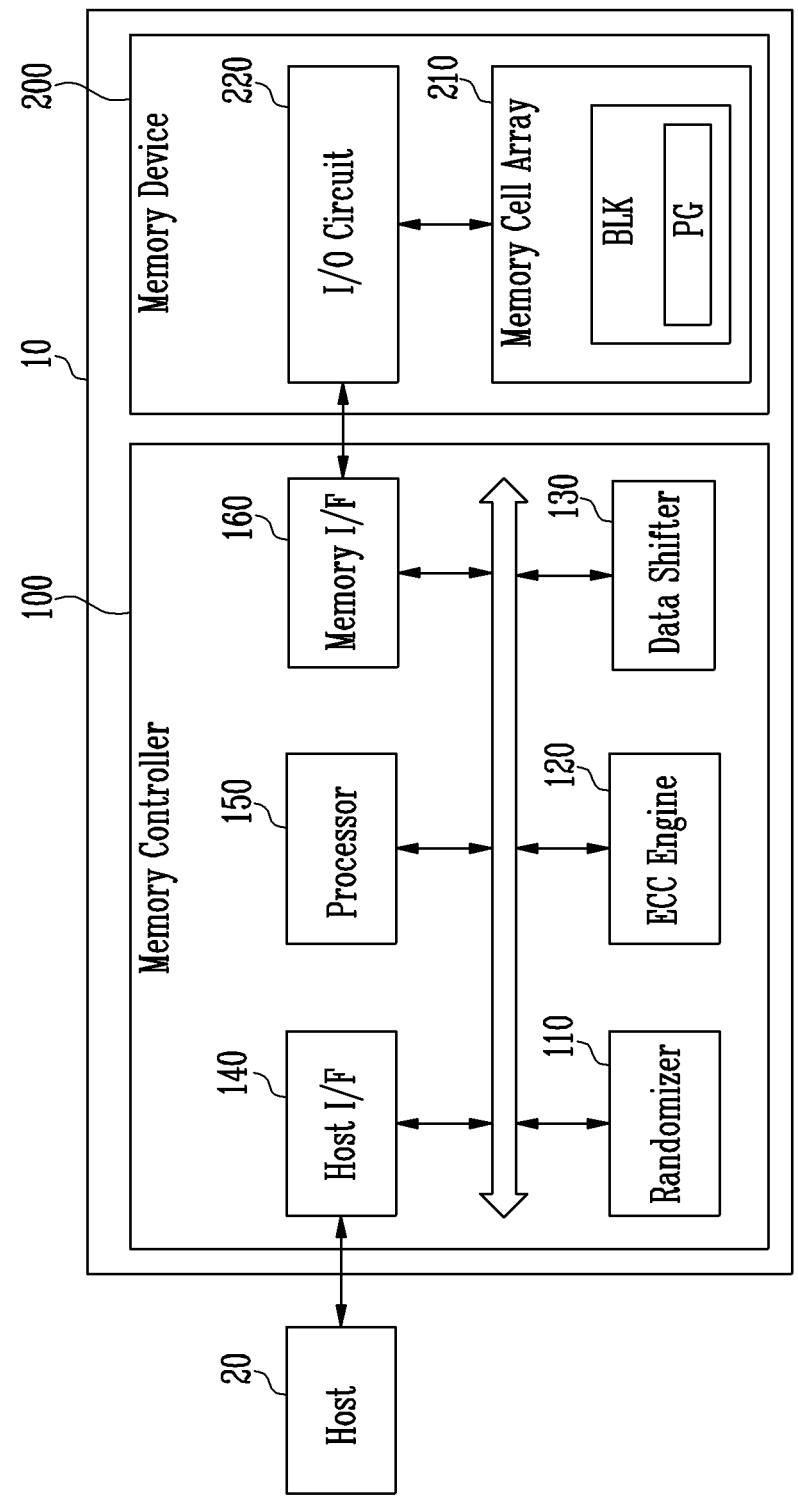
FIG. 1 is a diagram illustrating a storage device according to an embodiment of the present disclosure.

FIG. 1 is a diagram illustrating a storage device according to an embodiment of the present disclosure.

Referring to FIG. 1, the storage device 10 according to an embodiment may store data under control of a host 20. The storage device 10 may be various types of electronic devices such as a multi-media card, a secure digital card, a universal serial bus (USB) storage device, a universal flash storage (UFS) device, a solid state drive (SSD) device, and a peripheral component interconnect express (PCI-E) card type of storage device, a compact flash (CF) card, a network attached storage (NAS), and a direct attached storage (DAS). The host 20 may be various types of electronic devices such as a smart phone, a computer, a game console, a TV, a tablet PC, an IoT device, a server, an artificial intelligence learning device, or an in-vehicle infotainment system. The storage device 10 may be implemented as an electronic device mounted inside the host 20 or positioned outside the host 20.

In an embodiment, the storage device 10 may include a memory controller 100 and a memory device 200. The memory controller 100 may control an operation of the memory device 200. The memory device 200 may store data or output stored data under the control of the memory controller 100.

In an embodiment, the memory controller 100 may include a randomizer 110, an error correction code (ECC) engine 120, a data shifter 130, a host interface (I/F) 140, a processor 150, and a memory interface 160.

The randomizer 110 may obtain random data for original data or original data for random data. Here, the random data may be data obtained by changing the original data so that a bit-value has a random pattern. The random data may include a plurality of bits. Among the plurality of bits included in the random data, each of a number of bits having a first bit-value and a number of bits having a second bit-value may be within a reference range.

The ECC engine 120 may perform encoding on data or decoding on data. In an embodiment, encoding indicates generating an error correction code for data, and decoding indicates restoring data to the original data using the error correction code. The ECC engine 120 may obtain restoration data by decoding read data. When decoding on the read data failed, the ECC engine 120 may obtain the restoration data by decoding the shift data obtained by the data shifter 130.

The data shifter 130 may determine occurrence of a data shift error. For example, when decoding on the read data failed, the data shifter 130 may count a plurality of bits included in the read data by dividing the plurality of bits into the first bit-value and the second bit-value and determine the occurrence of the data shift error using the counted number. The data shifter 130 may obtain shift data obtained by shifting data when the data shift error occurs. The ECC engine 120 may obtain the restoration data by performing decoding on the shift data.

The host interface 140 may receive data from the host 20 or transmit data to the host 20. The host interface 140 may be configured to perform communication using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI express), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The processor 150 may control the operation of the memory device 200. Specifically, the processor 150 may generate and output a command and an address for controlling the operation of the memory device 200. For example, when the processor 150 transmits a read command and the address to the memory device 200 through the memory interface 160, the memory device 200 may perform a read operation of reading data from a selected page indicated by the address and outputting the data in response to the read command.

The processor 150 may perform a function of a flash translation layer. When a logical address for a write operation is received, the flash translation layer may select one of a plurality of physical addresses included in an address table, map a logical address to the selected physical address, and store mapping information of the logical address and the selected physical address in a mapping table. When a logical address for the read operation is received, the flash translation layer may obtain a physical address mapped to the corresponding logical address from the mapping table.

The memory interface 160 may receive data from an input/output circuit 220 of the memory device 200 or transmit data to the input/output circuit 220. In an embodiment, the memory interface 160 may be connected to the input/output circuit 220 of the memory device 200 through a plurality of input/output pins. Each of the plurality of input/output pins may transmit and receive a signal indicating a bit. Here, a high level of the signal may indicate the first bit-value, and a low level of the signal may indicate the second bit-value.

The memory device 200 may perform the write operation to store data or perform the read operation to output stored data. For example, the memory device 200 may be a nonvolatile semiconductor memory device. The nonvolatile semiconductor memory device may maintain stored data even though power is not supplied.

In an embodiment, the memory device 200 may include a memory cell array 210 and the input/output circuit 220. The memory cell array 210 may include a plurality of memory blocks BLK. One memory block BLK may include a plurality of pages PG. One page PG may include a plurality of memory cells. The plurality of memory cells included in one page PG may be connected to one word line. Each of the plurality of memory cells included in one page PG may be connected to a corresponding bit line. The memory cell may be implemented as a NAND flash memory, a NOR flash memory, or the like. The memory cell indicates a minimum unit that independently stores data. One memory cell may store one bit according to a single level cell (SLC) method. However, this is only an embodiment, and one memory cell may store two or more bits according to a multi-level cell (MLC) method, a triple level cell (TLC) method, or the like. The page PG may be a unit in which the write operation in which data is stored or the read operation in which data is read is performed, and the memory block BLK may be a unit in which an erase operation in which data is erased is performed. The input/output circuit 220 may transmit and receive data to and from the memory interface 160.

Figure 2:
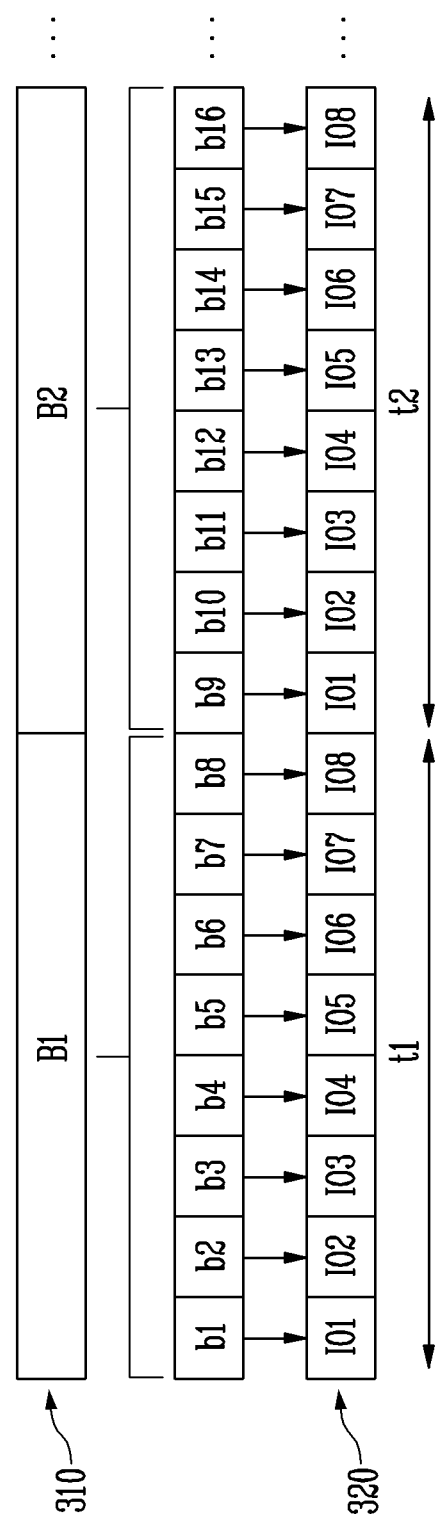
FIG. 2 is a diagram illustrating data according to an embodiment of the present disclosure.

FIG. 2 is a diagram illustrating data according to an embodiment of the present disclosure.

Referring to FIGS. 1 and 2, the memory controller 100 and the memory device 200 according to an embodiment may transmit and receive data 310 through a plurality of input/output pins IO1 to IO8. The data 310 may be write data to be stored in the memory device 200 or read data read from the memory device 200. The write data may be transmitted from the memory controller 100 to the memory device 200, and the read data may be transmitted from the memory device 200 to the memory controller 100.

The data 310 may include a plurality of bytes B1 and B2. For example, a first byte B1 may be positioned in a first column of the data 310, a second byte B2 may be positioned in a second column, and a third byte may be positioned in a third column. Here, a direction from the first column to the third column may be defined as a right direction, and a direction from the third column to the first column may be defined as a left direction. That is, the second column is a column positioned in the right direction of the first column and positioned in the left direction of the third column. Each byte may include a plurality of bits. For example, the first byte B1 may include a first bit b1 to an eighth bit b8. The second byte B2 may include a ninth bit b9 to a sixteenth bit b16. Each bit may have one of the first bit-value and the second bit-value. For example, the first bit-value may be 0 and the second bit-value may be 1.

In an embodiment, the data 310 may be transmitted in a byte unit. Specifically, the first bit b1 to the eighth bit b8 included in the first byte B1 may be transmitted in parallel through respective input/output pins 320 during a first time t1, and the ninth bit b9 to the sixteenth bit b16 included in the second byte B2 may be transmitted in parallel through respective input/output pins 320 during a second time t2. For example, the first bit b1 of the first byte B1 may correspond to a first input/output pin IO1, and the second bit b1 of the first byte B1 may correspond to a second input/output pin IO2. In such a method, the third bit b3 to the eighth bit b8 of the first byte B1 may respectively correspond to a third input/output pin IO3 to an eighth input/output pin IO8. In addition, the ninth bit b9 to the sixteenth bit b16 of the second byte B2 may respectively correspond to the first input/output pin IO1 to the eighth input/output pin IO8. Moreover, in FIG. 2, data is transmitted in a 1 byte unit, but this is only an embodiment, and a transmission unit of data may be variously modified.

The bit included in the data 310 may be stored in a corresponding memory cell among the plurality of memory cells included in the memory device 200. Specifically, the memory device 200 may perform the write operation of programming the memory cell to have a program state corresponding to a bit-value. For example, when the memory device 200 performs the write operation using the SLC method, the memory cell may be programmed to have a first program state to store the first bit-value and the memory cell may be programmed to have a second program state to store the second bit-value. Here, the first program state may mean that a threshold voltage of the memory cell is lower than a reference level, and the second program state may mean that the threshold voltage of the memory cell is equal to or greater than the reference level. In addition, the memory device 200 may perform the read operation of reading a program state of the memory cell through a read voltage. For example, the memory device 200 may read a bit-value corresponding to the program state of the memory cell by sensing that a channel is turned on or off according to a magnitude relationship between the threshold voltage and the read voltage of the memory cell.

In an embodiment, a data shift error may occur in the data 310 due to various causes. For example, when a portion of byte is missed or added in a transmission process of the data 310, a receiving device may receive error data in which the data shift error occurs. Here, the receiving device may be the memory controller 100 or the memory device 200. The error data may be data generated by shifting the plurality of bytes included in the data 310 in the left direction or the right direction in the byte unit.

For example, when the first byte B1 is missed from the data 310, the received error data may be data advanced in the left direction by 1 byte from the second byte B2 to a subsequent byte as a whole. That is, the second byte B2 may be positioned in a first column of the error data, the third byte may be positioned in a second column, and a byte having a missing value may be positioned in a third column. The missing value may be set to various values such as '0' and 'FF' in advance. For another example, when the data 310 is received together with a noise byte, the received error data may be data shifted in the right direction in a 1 byte unit from the first byte B1 to a subsequent byte as a whole. That is, the noise byte may be positioned in the first column of the error data, the first byte B1 may be positioned in the second column, and the second byte B2 may be positioned in the third column.

According to the present disclosure, the memory controller 100 may accurately determine whether the data shift error occurs in the read data received from the memory device 200, and obtain the restoration data obtained by restoring the original data through a data shift operation when the data shift error occurs.

Figure 3:
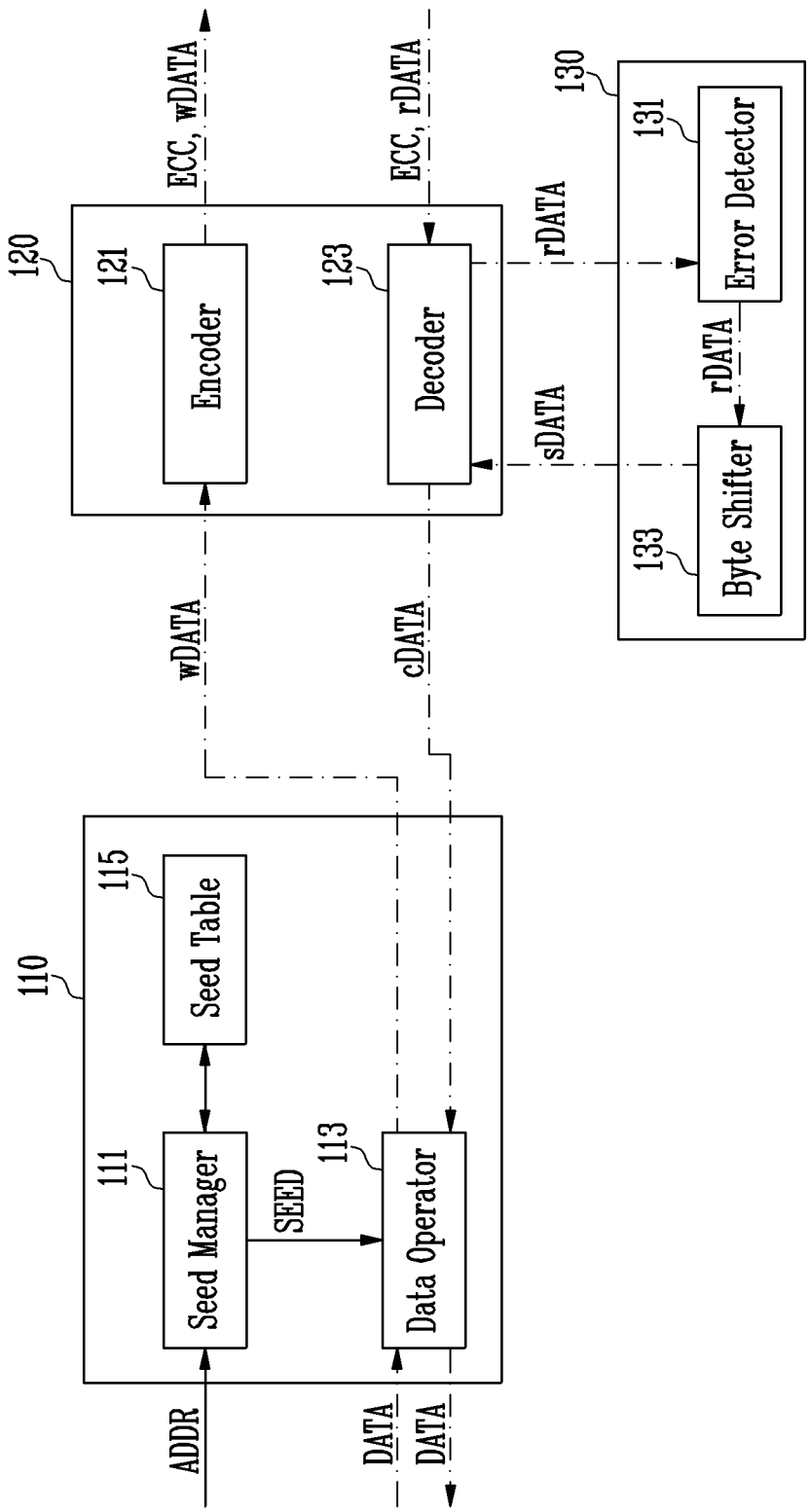
FIG. 3 is a diagram illustrating a randomizer, an ECC engine, and a data shifter of a storage device according to an embodiment of the present disclosure.

FIG. 3 is a diagram illustrating a randomizer, an ECC engine, and a data shifter of a storage device according to an embodiment of the present disclosure.

Referring to FIG. 3, the randomizer 110 may obtain random data for original data DATA. The randomizer 110 may obtain the original data DATA for the random data.

In an embodiment, the randomizer 110 may include a seed manager 111, a data operator 113, and a seed table 115.

When an address ADDR is received, the seed manager 111 may output a seed SEED corresponding to the address ADDR. The address ADDR may indicate a specific page in which data corresponding to the original data DATA is stored among the plurality of pages of the memory device 200. The address ADDR may be obtained by the processor 150. The seed manager 111 may store information indicating a correspondence relationship between the address ADDR and the seed SEED in a seed table 115 or obtains the seed SEED corresponding to the address ADDR from the seed table 115. For example, the seed table 115 may store the information indicating the correspondence relationship between the address ADDR and the seed SEED in a form of a lookup table.

In an embodiment, the data operator 113 may obtain the random data based on the original data DATA and the seed SEED. For example, the data operator 113 may obtain the random data by performing an exclusive OR operation on the original data DATA and the seed SEED. Here, the random data (or scramble data) indicates data in which a pattern of a bit-value of a bit included in the original data DATA is transformed.

For example, the random data obtained by transforming the original data DATA may be obtained so that each of the number (or ratio) of bits having the first bit-value and the number (or ratio) of bits having the second bit-value falls within the reference range. Specifically, each of the number of bits having the first bit-value and the number of bits having the second bit-value may be equal to or greater than a minimum value of the reference range and equal to or less than a maximum value of the reference range. For example, the first bit-value may be 0 and the second bit-value may be 1. Here, the minimum value of the reference range may be a value corresponding to 50−a %, and the maximum value of the reference range may be a value corresponding to 50+a %. At this time, a may be a value determined according to a specification of the randomizer 110. The random data may be write data wDATA to be stored in the memory device 200. The memory cell included in the memory device 200 may be programmed to have a program state corresponding to the first bit-value or the second bit-value of the bit to store a bit-value. The program state may indicate a state distinguished by the threshold voltage of the memory cell. When storing the random data, the memory device 200 may maintain the program state of the memory cell in an equal number, and thus may more effectively prevent a retention error than a case where the original data DATA is stored as it is.

In an embodiment, the data operator 113 may obtain the original data DATA based on restoration data cDATA and the seed SEED. For example, the data operator 113 may obtain the original data DATA by performing an exclusive OR operation on the restoration data cDATA and the seed SEED. Here, the restoration data cDATA may be data obtained when decoding on read data rDATA or shift data sDATA, is successful. That is, the restoration data cDATA may be valid data in which an error bit does not exist or an error bit is corrected. In this case, the restoration data cDATA may be the same data as the write data wDATA. The original data DATA may be output to the host or used for an operation of the processor.

The ECC engine 120 may obtain the error correction code by encoding the write data wDATA. The ECC engine 120 may obtain the restoration data cDATA by decoding the read data rDATA. The ECC engine 120 may perform encoding or decoding using a method of a low density parity check (LDPC) code, a BCH code, a turbo code, a Reed-Solomon code, a convolution code, a recursive systematic code (RSC), a trellis-coded modulation (TCM), a block coded modulation (BCM), or the like. The ECC engine 120 may include all circuits, systems, or devices for error correction.

In an embodiment, the ECC engine 120 may include an encoder 121 and a decoder 123.

The encoder 121 may obtain an error correction code ECC for the write data wDATA by encoding the write data wDATA. The write data wDATA may be data to be stored in the memory device 200. The error correction code ECC may be additional data for detecting an error bit included in data and correcting the error bit. For example, the encoder 121 may obtain the error correction code ECC by performing an operation according to various error detection/correction methods such as a Hamming code, a Reed-Solomon code, a Bose Chaudhuri-Hocquenghem (BCH) code, a cyclic redundancy check (CRC) code, a Viterbi code, and a Turbo code as the error correction code ECC on the write data wDATA.

The encoder 121 may output the write data wDATA and the error correction code ECC. The processor may transmit a write command, the address, the write data wDATA, and the error correction code ECC to the memory device 200 through the memory interface. The memory device 200 may perform the write operation on a page indicated by the address in response to the write command to store the write data wDATA and the error correction code ECC.

The decoder 123 may perform decoding on the read data rDATA. When receiving the read data rDATA and the error correction code ECC from the memory device 200, the decoder 123 may perform decoding on the read data rDATA using the error correction code ECC. The error correction code ECC may be generated by performing encoding on the write data wDATA. The write data wDATA may be data to be stored in the memory device 200 through the write operation, and the read data rDATA may be data obtained by the memory device 200 through the read operation.

For example, the decoder 123 may obtain decoding data by performing an operation on the read data rDATA using the error correction code ECC. The decoder 123 may count the number of error bits included in the decoding data. When the number of error bits is equal to or less than a reference value indicating an error correction capability, the decoder 123 may obtain the restoration data cDATA in which the error bit is corrected. That is, when the number of error bits is equal to or less than the reference value, the decoder 123 may determine that decoding on the read data rDATA is successful and output the restoration data cDATA. Furthermore, when the number of error bits exceeds the reference value, the decoder 123 may determine that decoding on the read data rDATA failed and output the read data rDATA. In an embodiment, the reference value may indicate the number of bits, which can be error-corrected within one chunk of data by the ECC engine 120, and may be a value determined in advance. For example, the reference value may be k, where k is a natural number equal to or greater than 1.

The data shifter 130 may determine whether the data shift error occurs, and obtain the shift data sDATA. Here, the shift data sDATA may be data obtained by shifting data for input data in the byte unit.

In an embodiment, the data shifter 130 may include an error detector 131 and a byte shifter 133.

The error detector 131 may determine whether the data shift error occurs based on the number of bits having the first bit-value and the number of bits having the second bit-value among a plurality of bits included in the read data rDATA. For example, when receiving a failure signal indicating that decoding on the read data rDATA failed, the error detector 131 may determine whether a data shift error occurs according to whether each of the number of bits having the first bit-value and the number of bits having the second bit-value among the plurality of bits included in the read data rDATA is within the reference range. For example, the failure signal may be a signal including the read data rDATA.

In an embodiment, the error detector 131 may count the number of bits having the first bit-value and the number of bits having the second bit-value among the plurality of bits included in the read data rDATA. The error detector 131 may determine that the data shift error occurs when each of the number of bits having the first bit-value and the number of bits having the second bit-value among the plurality of bits included in the read data rDATA is within the reference range. The error detector 131 may determine that the data shift error does not occur when any of the number of bits having the first bit-value and the number of bits having the second bit-value among the plurality of bits included in the read data rDATA is beyond the reference range. For example, a minimum value of the reference range may be a value corresponding to 50−a %, and a maximum value of the reference range may be a value corresponding to 50+a %. At this time, a may be a value determined according to the specification of the randomizer 110.

In an embodiment, the error detector 131 may count the number of bits having the first bit-value and the number of bits having the second bit-value for each of a plurality of input/output pins among the plurality of bits included in the read data rDATA. For example, the bits having the first bit-value and the bits having second bit-value may be transferred through each of the input/output pins. For example, the error detector 131 may count the number of bits having the first bit-value and the number of bits having the second bit-value among bits transmitted through each input/output pin. The error detector 131 may determine that the data shift error occurs when each of the number of bits having the first bit-value and the number of bits having the second bit-value for each of the plurality of input/output pins is within the reference range. The error detector 131 may determine that the data shift error does not occur when any of the number of bits having the first bit-value and the number of bits having the second bit-value for each of the plurality of input/output pins is beyond the reference range.

When it is determined that the data shift error occurs, the error detector 131 may output an error detection signal indicating that the data shift error occurs. For example, the error detection signal may include the read data rDATA.

When the error detection signal indicating that the data shift error occurs is received from the error detector 131, the byte shifter 133 may obtain and output the shift data sDATA obtained by shifting the read data rDATA in the left direction or the right direction in the byte unit.

The decoder 123 may perform decoding on the shift data sDATA received from the data shifter 130. The decoder 123 may obtain the decoding data by performing an operation on the shift data sDATA using the error correction code ECC. Here, the error correction code ECC may be used for decoding the read data rDATA. When the number of error bits included in the decoding data is equal to or less than the reference value indicating the error correction capability, the decoder 123 may obtain and output the restoration data cDATA in which the error bit is corrected. When the number of error bits exceeds the reference value, the decoder 123 may determine that decoding on the shift data sDATA failed and output the shift data sDATA to the byte shifter 133. In this case, the byte shifter 133 may obtain new shift data obtained by shifting the shift data sDATA in the left direction or the right direction in the byte unit, and output the new shift data to the decoder 123.

In an embodiment, when decoding on the shift data sDATA failed, an output operation of the shift data sDATA of the byte shifter 133 and the decoding operation on the shift data sDATA of the decoder 123 may be repeatedly performed until decoding on the shift data sDATA is successful within a maximum number of times. That is, when decoding failed and the number of times decoding failed is within the maximum number of times, the output operation and the decoding operation of the shift data sDATA may be repeatedly performed, and when decoding failed and the number of times decoding failed exceeds the maximum number of times, the decoder 123 may output an error correction failure signal indicating that error correction is impossible, and the output operation and the decoding operation of the shift data sDATA may be stopped. When decoding on the shift data sDATA is successful, the decoder 123 may output, as the restoration data cDATA, the shift data sDATA, on which the decoding is successful, and the output operation and the decoding operation of the shift data sDATA may be stopped.

Here, the maximum number of times may be determined according to the reference value. In an embodiment, when the reference value is k, the maximum number of times may be determined between values k/8 and k/4 and may be a natural number. That is, data may be shifted within the maximum number of times.

For example, when the reference value is 130, the maximum number of times may be set within a range equal to or greater than 16.25 ($=^{130}/_8$) which is a minimum value and equal to or less than 32.5 ($=^{130}/_4$) which is a maximum value. Here, the maximum number of times may be a natural number and may be set in advance. For example, the maximum number of times may be set to 32. The data may be shifted one byte at a time. In this case, data may be shifted up to maximum 32 bytes to be restored. For example, when the write data wDATA is [59, 32, B4, 2E, F0, 87, . . . ] and the read data rDATA in which 2 bytes is lost is [B4, 2E, F0, 87, . . . ], the shift data sDATA shifted by 2 bytes may be [00, 00, B4, 2E, F0, 87, . . . ]. In this case, when the write data wDATA and the shift data sDATA are compared, the number of error bits included in the shift data sDATA is seven. Illustratively, a byte (hexadecimal number) of [00, 00] may be indicated by a bit (binary number) of [00000000, 00000000], a byte (hexadecimal number) of [B4, 2E] may be indicated by a bit (binary number) of [01011001, 00110010], and a part in which a value of a bit is different may be an error bit. Since the number of error bits is less than the reference value, error correction of the shift data sDATA may be possible. When 33 bytes or more exceeding the maximum number of times are shifted, since the expected number of error bits (for example, 132 bits) of the shift data sDATA exceeds the reference value, a shift attempt may be unnecessary, and in this case, the decoder 123 may determine that a data recovery operation failed and terminate the data recovery operation.

In an embodiment, when decoding is successful, the encoder 121 may obtain a new error correction code by performing encoding on restoration data cDATA. The processor 150 may control the memory device 200 to store the restoration data cDATA and the new error correction code in a page different from the selected page among the plurality of pages of the memory device 200. For example, the processor 150 may transmit the write command, an address indicating another page, the restoration data cDATA, and the new error correction code to the memory device 200 through the memory interface. In an embodiment, the processor 150 may process data stored in the selected page as invalid data. In an embodiment, when decoding is successful, the data operator 113 may obtain the original data DATA using the seed SEED and the restoration data cDATA output from the decoder 123.

Figure 4:
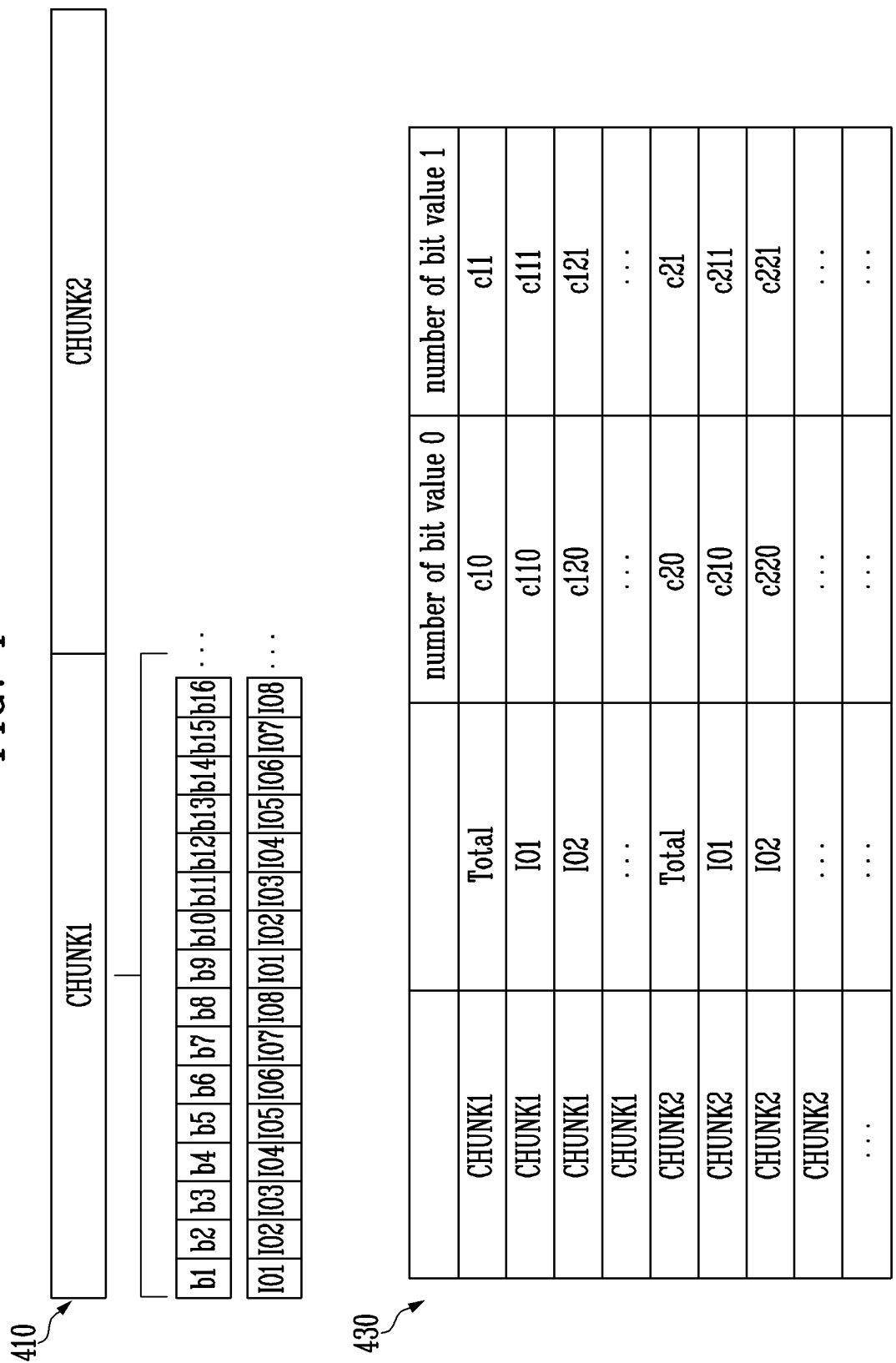
FIG. 4 is a diagram for describing a method of counting a bit included in read data according to an embodiment of the present disclosure.

FIG. 4 is a diagram for describing a method of counting a bit included in read data 410 according to an embodiment of the present disclosure.

Referring to FIG. 4, the read data 410 may include at least one or more chunks CHUNK1 and CHUNK2. The chunks CHUNK1 and CHUNK2 may be data of a unit stored in at least a partial area of one page. The chunks CHUNK1 and CHUNK2 may include a plurality of bits b1 to b16. Furthermore, a description of the read data 410 of FIG. 4 may be equally applied to write data. An operation on the data of FIG. 3 described above may be performed in a chunk unit.

The memory controller 100 (refer to FIG. 1) may receive the read data 410 from the memory device 200 (refer to FIG. 1) through the plurality of input/output pins IO1 to IO8. The memory controller 100 may receive bit b1 to b16 of the read data 410 through the respective input/output pins IO1 to IO8.

In an embodiment, the memory controller 100 may perform decoding on the plurality of chunks CHUNK1 and CHUNK2 included in the read data 410 in the chunk unit. A description for this may be equally applied to the description of the decoder 123 described above, and an overlapping content is omitted.

For example, the memory controller 100 may perform decoding on a first chunk CHUNK1 using a first error correction code and perform decoding on a second chunk CHUNK2 using a second error correction code. Here, the first error correction code may be generated as a result of encoding the first chunk of the write data corresponding to the read data 410, and the second error correction code may be generated as a result of encoding the corresponding second chunk of the write data. Here, when the number of error bits included in the first chunk CHUNK1 exceeds the reference value indicating the error correction capability, the memory controller 100 may determine that decoding on the first chunk CHUNK1 failed because the error correction is impossible. When the number of error bits included in the second chunk CHUNK2 is equal to or less than the reference value, the memory controller 100 may obtain restoration data in which an error bit of the second chunk CHUNK2 is corrected.

Hereinafter, the present disclosure is described under a case in which decoding on the first chunk CHUNK1 failed. For example, as shown in a table 430, the memory controller 100 may count the number of first bit-values and second bit-values among a plurality of bits b1 to b16 included in the first chunk CHUNK1, and may determine that a data shift error occurs with respect to the first chunk CHUNK1. A description for this may be equally applied to the description of the error detector 131 described above, and overlapping content is omitted.

For example, among the total bits b1 to b16 included in the first chunk CHUNK1, the number of first bit-values may be c10 and the number of second bit-values may be c11. In this case, the memory controller 100 may determine that the data shift error occurs with respect to the first chunk CHUNK1 when c10 is within the reference range and c11 is within the reference range with respect to the first chunk CHUNK1. The memory controller 100 may determine that the data shift error does not occur with respect to the first chunk CHUNK1 when c10 is beyond the reference range or c11 is beyond the reference range with respect to the first chunk CHUNK1. For example, a minimum value of the reference range may be a value corresponding to 50−a %, and a maximum value of the reference range may be a value corresponding to 50+a %.

In an embodiment, the memory controller 100 may count the number of first bit-values and second bit-values with respect to the plurality of bits included in the read data 410 in a chunk unit and may count the numbers of first and second bit-values, which are transferred through a corresponding one of the input/output pins IO1 to IO8. For example, as shown in the table 430, the memory controller 100 may count c110 which is the number of first bit-values transferred through the first input/output pin IO1 among the plurality of bits b1 to b16 included in the first chunk CHUNK1, and c211 which is the number of second bit-values transferred through the first input/output pin IO1. In the same method, the memory controller 100 may count each number of first bit-values and second bit-values transferred through a corresponding one of the remaining input/output pins IO2 to IO8 among the plurality of bits b1 to b16 included in the first chunk CHUNK1.

In this case, when each number of the first and second bit-values within the first chunk CHUNK1 and each number of the first and second bit-values transferred through each of the input/output pins IO1 to IO8 is within the reference range, the memory controller 100 may determine that the data shift error occurs with respect to the first chunk CHUNK1. When any of the respective numbers within the first chunk CHUNK1 and the respective numbers transferred through each of the input/output pins IO1 to IO8 is beyond the reference range, the memory controller 100 may determine that the data shift error does not occur with respect to the first chunk CHUNK1.

In an embodiment, when each of the number of first bit-values and the number of second bit-values among the plurality of bits b1 to b16 is within the reference range and when each number of the first and second bit-values transferred through each of the input/output pins IO1 to IO8 is within the reference range, the memory controller 100 may determine that the data shift error occurs with respect to the first chunk CHUNK1.

Figure 5:
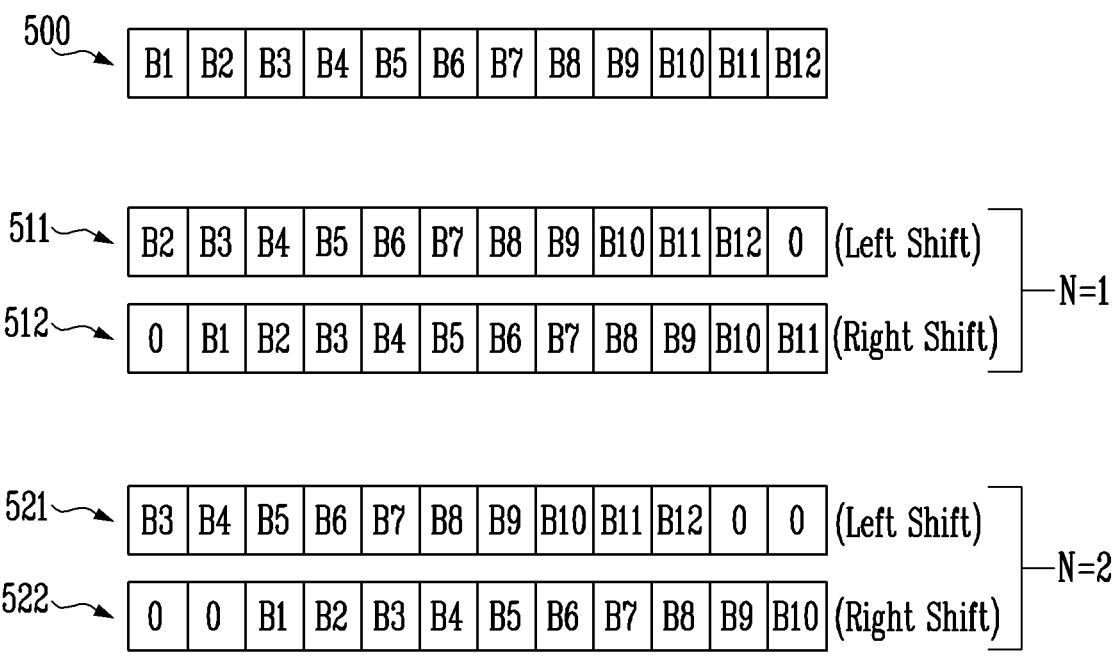
FIG. 5 is a diagram for describing a data shift operation according to an embodiment of the present disclosure.

FIG. 5 is a diagram for describing a data shift operation according to an embodiment of the present disclosure.

Referring to FIG. 5, read data 500 may include a plurality of bytes B1 to B12. For example, in FIG. 5 decoding failed on the read data 500 and the data shift error occurs.

The byte shifter 133 (refer to FIG. 3) may obtain first left shift data (i.e., left-shifted data) 511 obtained by shifting the read data 500 in the left direction in the byte unit. The first left shift data 511 may be obtained by shifting all bytes B1 to B12 included in the read data 500 in the left direction by one byte. In an embodiment, the byte shifter 133 may obtain the first left shift data 511 by discarding a first byte B1 positioned in the leftmost column among the bytes B1 to B12 included in the read data 500 and adding a preset byte such as '0' and 'FF' in the rightmost column.

The decoder 123 (refer to FIG. 3) may perform decoding on the first left shift data 511 using an error correction code. Here, the error correction code may be used to decode the read data 500. When decoding on the first left shift data 511 is successful, the decoder 123 may obtain restoration data for the first left shift data. When decoding on the first left shift data 511 failed, the decoder 123 may output a failure signal indicating that decoding failed to the byte shifter 133.

When decoding failed, the byte shifter 133 may obtain first right shift data (i.e., right-shifted data) 512 obtained by shifting the read data 500 in the right direction in the byte unit. The first right shift data 512 may be obtained by shifting all bytes B1 to B12 included in the read data 500 in the right direction by one byte. In an embodiment, the byte shifter 133 may obtain the first right shift data 512 by discarding a twelfth byte B12 positioned in the rightmost column among the bytes B1 to B12 included in the read data 500 and adding a preset byte such as '0' and 'FF' in the leftmost column.

The decoder 123 (refer to FIG. 3) may perform decoding on the first right shift data 512 using an error correction code. Here, the error correction code may be used to decode the read data 500. When decoding on the first right shift data 512 is successful, the decoder 123 may obtain restoration data for the first right shift data 512. When decoding on the first right shift data 512 failed, the decoder 123 may output a failure signal indicating that decoding failed to the byte shifter 133.

When decoding failed, the byte shifter 133 may obtain second left shift data 521 obtained by shifting the first left shift data 511 in the left direction in the byte unit. The second left shift data 521 may be obtained by shifting all bytes B1 to B12 included in the read data 500 in the left direction by two bytes. The decoder 123 may perform decoding on the second left shift data 521 using an error correction code, and output a failure signal to the byte shifter 133 when decoding failed.

When decoding failed, the byte shifter 133 may obtain second right shift data 522 obtained by shifting the first right shift data 512 in the right direction in the byte unit. The second right shift data 522 may be obtained by shifting all bytes B1 to B12 included in the read data 500 in the right direction by two bytes. The decoder 123 may perform decoding on the second right shift data 522 using an error correction code, and output a failure signal to the byte shifter 133 when decoding failed.

The byte shifter 133 and the decoder 123 may repeatedly perform the above-described operation within a maximum number of times. The decoder 123 may output the restoration data when decoding is successful within the maximum number of times and output the decoding failure signal when decoding failed within the maximum number of times.

Furthermore, an order of obtaining the above-described left shift data or right shift data may be changed.

Figure 6:
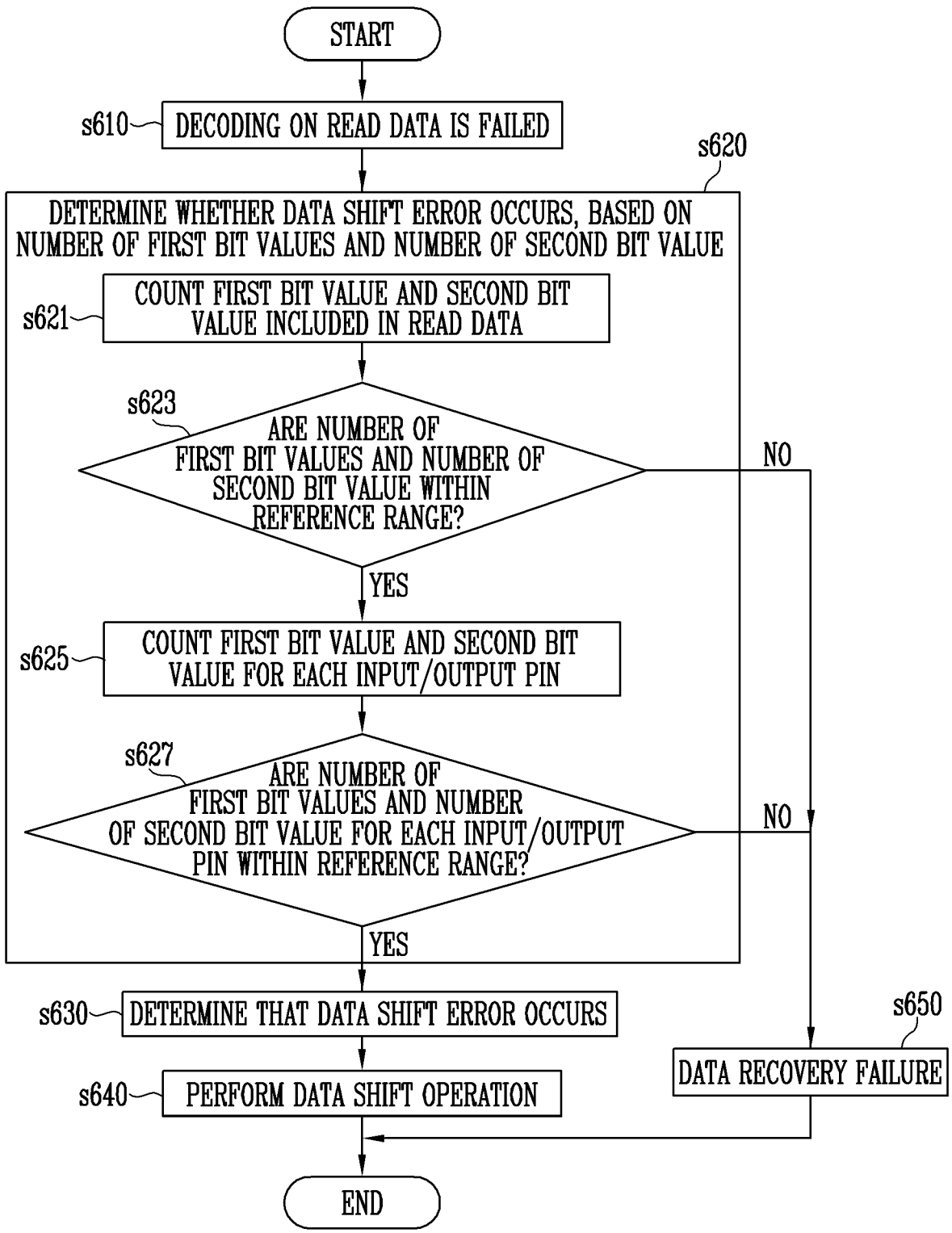
FIG. 6 is a diagram for describing a method of operating a storage device according to an embodiment of the present disclosure.

FIG. 6 is a diagram for describing a method of operating a storage device according to an embodiment of the present disclosure.

Referring to FIG. 6, according to an embodiment, when decoding on the read data read from the memory device 200 (refer to FIG. 1) failed (operation s610), the memory controller 100 (refer to FIG. 1) may determine whether the data shift error occurs based on the number of bits having the first bit-value and the number of bits having the second bit-value among the plurality of bits included in the read data (operation s620). For example, the memory controller 100 may perform decoding on the read data using the error correction code, when the detected number of error bits is equal to or less than the reference value, the memory controller 100 may determine that decoding on the read data is successful, and when the number of error bits exceeds the reference value, the memory controller 100 may determine that decoding on the read data failed. In addition, when it is determined that the data shift error occurs (operation s630), the memory controller 100 may perform the data shift operation of shifting the read data (operation s640).

In an embodiment, determining whether the data shift error occurs (operation s620) may include counting the number of bits having the first bit-value and the number of bits having the second bit-value among the plurality of bits included in the read data (operation s621) and determining whether the data shift error occurs according to whether each of the number of bits having the first bit-value and the number of bits having the second bit-value among the plurality of bits is within the reference range (operation s623). For example, when each of the number of bits having the first bit-value and the number of bits having the second bit-value among the plurality of bits is within the reference range (Yes in the operation s623), it may be determined that the data shift error occurs (operation s630). When any of the number of bits having the first bit-value and the number of bits having the second bit-value among the plurality of bits is beyond the reference range (No in the operation s623), it may be determined that the data recovery failed (operation s650).

In an embodiment, determining whether the data shift error occurs (operation s620) may include counting the number of bits having the first bit-value and the number of bits having the second bit-value for each input/output pin among the plurality of bits included in the read data (operation s625) and determining whether the data shift error occurs according to whether each of the number of bits having the first bit-value and the number of bits having the second bit-value for each of the plurality of input/output pins among the plurality of bits included in the read data is within the reference number (operation s627). For example, when each of the numbers of bits having the first and second bit-values, which are transferred through each of the plurality of input/output pins among the plurality of bits, is within the reference range (Yes in the operation s627), it may be determined that the data shift error occurs (operation s630). When any of the numbers of bits having the first and second bit-values, which are transferred through each of the plurality of input/output pins among the plurality of bits, is beyond the reference range (No in the operation s627), it is determined that the data recovery failed (operation s650).

In an embodiment, when each of the numbers of bits having the first and second bit-values among the plurality of bits included in the read data is within the reference range (Yes in the operation s623) and when each of the numbers of bits having the first and second bit-values, which are transferred through each of the plurality of input/output pins among the plurality of bits, is within the reference range (Yes in the operation s627), it may be determined that the data shift error occurs (operation s630).

FIG. 7 is a diagram for describing an operating method related to a data shift operation according to an embodiment of the present disclosure.

Referring to FIG. 7, the method of operating the storage device 10 (refer to FIG. 1) may perform the data shift operation.

In an embodiment, the memory controller 100 (refer to FIG. 1) may set a level N at which the read data is shifted to 1 when it is determined that the data shift error occurs with respect to the read data read from the memory device 200 (refer to FIG. 1) (operation s710).

The memory controller 100 may obtain the shift data obtained by shifting the read data in the left direction in the byte unit (operation s720). The memory controller 100 may perform decoding on the shift data using the error correction code used for decoding the read data. When decoding on the shift data is successful (No in operation s730), the memory controller 100 may determine that the data recovery of obtaining the restoration data for the shift data is successful (operation s780).

When decoding on the shift data failed (Yes in the operation s730), the memory controller 100 may obtain the shift data obtained by shifting the read data in the right direction in the byte unit (operation s740). The memory controller 100 may perform decoding on the shift data using the error correction code used for decoding the read data. When decoding on the shift data is successful (No in operation s750), the memory controller 100 may determine that the data recovery of obtaining the restoration data for the shift data is successful (operation s780).

When decoding on the shift data failed (Yes in the operation s750), the memory controller 100 may compare the level N at which the read data is shifted with the maximum number of times M. The memory controller 100 may determine that the data recovery failed (operation s770) when the level N at which the read data is shifted is equal to or greater than the maximum number of times M (Yes in operation s760). Failure of the data recovery may indicate a state in which error correction for the read data is impossible (UECC).

The memory controller 100 may further increase the level N at which the read data is shifted by 1 when the level N at which the read data is shifted is less than the maximum number of times M (No in the operation s760). In this case, the memory controller 100 may perform an operation from the operation s720 described above.

In an embodiment, when decoding on the shift data is successful, the memory controller 100 may encode the restoration data obtained as a result of decoding and store the encoded data in the memory device 100. In this case, a new error correction code obtained by encoding the restoration data may be stored in the memory device 100 together with the encoding data.

According to an embodiment of the present disclosure as described above, the storage device 10 and the method of operating the same for determining occurrence of the data shift error may be provided. According to the present disclosure, at least a portion of data in which the data shift error occurs may be restored.

As a specific embodiment, important data such as mapping information of a logical address and a physical address may be stored in the SLC method that is less affected by the threshold voltage of the memory cell than in the TLC method. In this case, a bit error in which the threshold voltage is changed due to disturb, retention, or the like may occur relatively little, but may be vulnerable to the data shift error in which a position (or a location) of data in a byte unit is changed. In a case of the data shift error, when the important data is lost, a fatal error such as an impossibility of booting may occur. The present disclosure may accurately determine occurrence of the data shift error and restore data when the data shift error occurs.

While the present teachings have been illustrated and described with respect to the specific embodiments, it will be apparent to those skilled in the art in light of the present disclosure that various changes and modifications may be made without departing from the spirit and scope of the disclosure as defined in the following claims. Furthermore, the embodiments may be combined to form additional embodiments.

What is claimed is:

1. A storage device comprising:
a memory device including a plurality of pages; and
a memory controller configured to:
determine whether a data shift error occurs in read data read from a selected page among the plurality of pages based on a number of bits having a first bit-value and a number of bits having a second bit-value among a plurality of bits included in the read data,
generate shift data by shifting the read data in a left or right direction in a byte unit when the data shift error occurs, and
control the memory device to store restoration data and new error correction code obtained from the shift data in a page different from the selected page among the plurality of pages.

2. The storage device of claim 1, wherein the memory controller comprises:
a decoder configured to perform decoding on the read data using an error correction code; and
an error detector configured to determine, when the decoding fails on the read data, whether the data shift error occurs according to whether each of the number of bits having the first bit-value and the number of bits having the second bit-value among the plurality of bits is within a reference range.

3. The storage device of claim 2,
wherein the error detector determines that the data shift error occurs when:
each of the number of bits having the first bit-value and the number of bits having the second bit-value among the plurality of bits is within the reference range.

4. The storage device of claim 2,
wherein the error detector is further configured to generate a signal indicating that the data shift error occurs when the data shift error is determined to occur, and
wherein the memory controller further comprises a byte shifter configured to shift, in response to the signal indicating that the data shift error occurs, the read data to output the shift data.

5. The storage device of claim 4, wherein the decoder is further configured to:
perform decoding on the shift data using the error correction code, and
obtain restoration data when the decoding on the shift data is successful.

6. The storage device of claim 5, wherein the memory controller further comprises:

an encoder configured to obtain the new error correction code by performing encoding on the restoration data; and
a processor configured to control the memory device to store the restoration data and the new error correction code in the page different from the selected page among the plurality of pages.

7. The storage device of claim 5,
wherein, until the decoding on the shift data is successful, the byte shifter is further configured to repeat the shifting of the read data to output the shift data and the decoder is further configured to repeat the decoding on the shift data, within a maximum number of times.

8. A method of operating a storage device, the method comprising:
determining, when decoding fails on read data from a memory device, whether a data shift error occurs in the read data based on a number of bits having a first bit-value and a number of bits having a second bit-value among a plurality of bits included in the read data;
performing a data shift operation of shifting the read data in a left or right direction in a byte unit when the data shift error occurs to generate shift data; and
storing restoration data and new error correction code obtained from the shift data in the memory device.

9. The method of claim 8, wherein the determining comprises determining whether the data shift error occurs according to whether each of the number of bits having the first bit-value and the number of bits having the second bit-value among the plurality of bits is within a reference range.

10. The method of claim 8,
wherein the determining comprises determining that the data shift error occurs when:
each of the number of bits having the first bit-value and the number of bits having the second bit-value among the plurality of bits is within the reference range.

11. The method of claim 8, wherein the performing of the data shift operation comprises:
shifting, when the data shift error occurs, the read data to obtain the shift data; and
performing decoding on the shift data using an error correction code used for the decoding the read data.

12. The method of claim 11, wherein the performing the data shift operation further comprises:
shifting, when the decoding fails on a previous shift data, the previous shift data in the left direction or the right direction in the byte unit to obtain a current shift data; and
performing decoding on the current shift data using the error correction code.

13. The method of claim 12, wherein the performing the data shift operation further comprises:
encoding restoration data obtained through a successful result of the decoding the shift data; and
storing the encoded data in the memory device.

* * * * *